United States Patent
Ignaci et al.

(10) Patent No.: US 8,327,424 B2
(45) Date of Patent: Dec. 4, 2012

(54) METHOD AND APPARATUS FOR SELECTING A CERTIFICATE AUTHORITY

(75) Inventors: Ananth Ignaci, Lake In The Hills, IL (US); Adam C. Lewis, Buffalo Grove, IL (US); Anthony R. Metke, Naperville, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 456 days.

(21) Appl. No.: 12/644,977

(22) Filed: Dec. 22, 2009

(65) Prior Publication Data

US 2011/0154024 A1    Jun. 23, 2011

(51) Int. Cl.
    *H04L 29/06* (2006.01)
(52) U.S. Cl. ............. 726/6; 713/156; 713/157; 713/158
(58) Field of Classification Search .................. None
    See application file for complete search history.

(56) References Cited

U.S. PATENT DOCUMENTS

| | | |
|---|---|---|
| 7,328,344 B2 | 2/2008 | Chang |
| 2002/0046340 A1* | 4/2002 | Fujishiro et al. ............. 713/171 |
| 2002/0078347 A1* | 6/2002 | Hericourt et al. ............ 713/156 |
| 2002/0129135 A1 | 9/2002 | Delany et al. |
| 2003/0212888 A1* | 11/2003 | Wildish et al. ............... 713/158 |
| 2004/0073785 A1 | 4/2004 | Hurtta et al. |
| 2005/0076205 A1 | 4/2005 | Thornton et al. |
| 2008/0016336 A1 | 1/2008 | Stirbu et al. |

OTHER PUBLICATIONS

PCT International Search Report Dated Mar. 28, 2011.
Adams University of Ottawa S Farrell Trinity College Dublin T Kause SSH T Mononen Saffnet C; "Internet X.509 Public Key Infrastructure Certificate Management Protocol (CMP); rfc4210.txt", IETF Standard, Internet Engineering Task Force, IETF, CH, Sep. 1, 2005; XP015041820; ISSN:0000-0003.
International Preliminary Report on Patentability and Written Opinion for counterpart International Application No. PCT/US2010/058636 mailed on Jul. 5, 2012.

* cited by examiner

*Primary Examiner* — Matthew Henning
(74) *Attorney, Agent, or Firm* — Valerie M. Davis; Kenneth A. Haas

(57) ABSTRACT

A certificate authority selection unit implements a method for selecting one of a plurality of certificate authorities servicing a plurality of administrative domains in a communication system. The method includes: receiving, from an end-entity via an interface, a certificate service request associated with an identifier; selecting, based on the identifier, one of the plurality of administrative domains in the communication system, wherein the plurality of administrative domains are serviced by a plurality of certificate authorities; retrieving a security profile for the end-entity; and selecting, based on the security profile for the end-entity, one of the plurality of certificate authorities to process the certificate service request.

18 Claims, 4 Drawing Sheets

| DN ( OrganizationName: Company X ) | |
|---|---|
| DN [O]: Marketing | AD1 |
| DN [O]: Engineering | AD2 |
| DN [O]: Sales | AD1 |
| DN [O]: R&D | AD2 |
| DN [O]: Other | AD3 |

FIG. 3

METHOD AND APPARATUS FOR SELECTING A CERTIFICATE AUTHORITY

TECHNICAL FIELD

The technical field relates generally to communication systems and relates, in particular, to a method and apparatus for selecting a certificate authority from a plurality of certificate authorities servicing administrative domains to process a certificate service request.

BACKGROUND

Public key cryptography supports security services such as confidentiality (ensuring the secrecy and privacy of data through cryptographic encryption mechanisms), integrity (ensuring that data cannot be corrupted or modified and transactions cannot be altered), authentication (verifying the identity of entities) and non-repudiation (ensuring that the data cannot be renounced or a transaction denied), and a public key infrastructure (PKI) provides a foundation to implement and manage the security services supported by public key cryptography. The purpose of a PKI framework is to enable and support the secured exchange of data, credentials, and value (such as monetary instruments) in various environments that are typically insecure, such as the Internet.

The framework of a PKI consists of security and operational policies, security services, and operational protocols supporting the use of public-key cryptography through the management of cryptographic keys and certificates. The generation, distribution, and management of public keys and associated certificates occur in a PKI through the use of Certificate Authorities (CAs) and optionally Registration Authorities (RAs) and directory services, which can be used to establish a hierarchy or chain of trust. This is one of the primary principles of a PKI.

The concept of trust, relative to a PKI, can be explained by the role of a CA. In an insecure environment, entities unknown to each other do not have sufficient trust established between them to exchange secure data and perform transactions. More particularly, in public key cryptography, a user has a pair of cryptographic keys, a public key and a private key. The private key is kept secret, while the public key may be widely distributed. Messages are encrypted by the transmitter of the message with the intended recipient's public key and can only be decrypted with the intended recipient's corresponding private key. A central problem for use of public-key cryptography is confidence or assurance that a public key is correct, belongs to the person or entity claimed (i.e., is 'authentic'), and has not been tampered with or replaced by a malicious third party.

The implementation of a PKI using one or more CAs provides this trust. A CA allows for the implementation of digital certificates that can be used to identify different entities (e.g., individuals, groups, machines, etc.). More specifically, entities that are unknown to each other each individually establish a trust relationship with a CA. The CA (and optionally an RA) performs some level of authentication, according to established rules as noted in its Certificate Practices Statement or CPS, and then issues an entity a digital certificate certifying ownership of key pairs. That certificate is digitally signed by the CA and thus vouches for the identity of the entity; and the certificate is, typically, a message that includes, but is not limited to a name or identifies the certificate authority, identifies the end-entity, contains the end-entity's public key, identifies the certificate's operational period, contains a certificate serial number, and is digitally signed by the certificate authority. Unknown entities can now use their certificates to establish trust between them because they trust the CA to have performed an appropriate entity authentication, and the CA's signing of the certificate attests to this fact.

Certificates are managed (e.g., issued, renewed, or revoked) in response to a Certificate Service Request (CSR) sent by an entity. The CA (optionally in combination with a RA) determines whether to generate, renew, or revoke a certificate in response to a CSR. Large PKI systems have many Administrative Domains (ADs) each comprising a CA or a set of CAs and one or more RAs, Lightweight Directory Access Protocol (LDAP) directories, databases, and security and administrative staff that cater to the needs of one or more user communities (e.g., organizations, departments, etc.). A problem then becomes how to efficiently route CSRs through such large PKI systems to reach the appropriate CA to process the CSR.

Therefore, what is needed is a mechanism to route a CSR to an appropriate CA in a PKI system that includes a plurality administrative domains and a plurality of CAs that service those administrative domains by processing CSRs for requesting entities.

BRIEF DESCRIPTION OF THE FIGURES

The accompanying figures, where like reference numerals refer to identical or functionally similar elements throughout the separate views, together with the detailed description below, are incorporated in and form part of the specification and serve to further illustrate various embodiments of concepts that include the claimed invention, and to explain various principles and advantages of those embodiments.

FIG. 3 is an illustration of distinguished name to an administrative domain mapping in accordance with an embodiment.

Figure 1:
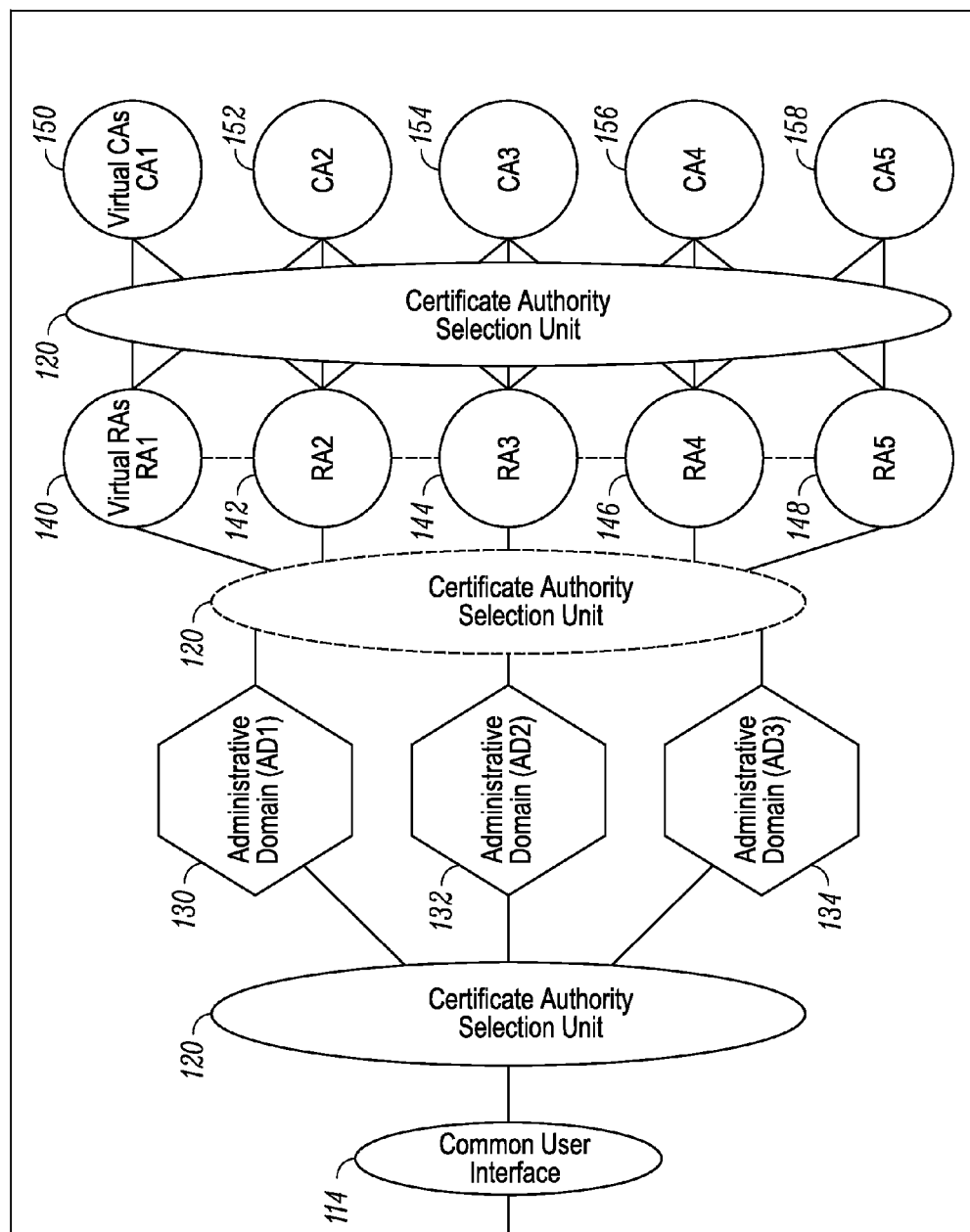
FIG. 1 is a block diagram of a communication system illustrating selection of a certificate authority in accordance with an embodiment.
Figure 1:
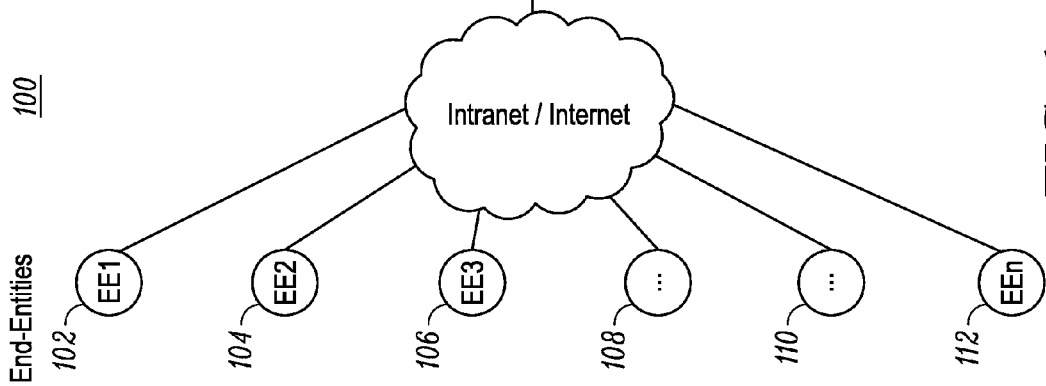

Skilled artisans will appreciate that elements in the figures are illustrated for simplicity and clarity and have not necessarily been drawn to scale. For example, the dimensions of some of the elements in the figures may be exaggerated relative to other elements to help improve understanding of various. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, a certificate authority selection unit implements a method for selecting one of a plurality of certificate authorities that service a plurality of administrative domains in a communication system. The method includes: receiving, from an end-entity via an interface, a certificate service request associated with an identifier; selecting, based on the identifier, one of the plurality of administrative domains in the communication system, wherein the plurality of administrative domain are serviced by a plurality of certificate authorities; retrieving a security profile for the end-entity; and selecting, based on the security profile for the end-entity, one of the plurality of certificate authorities to process the certificate service request.

In an embodiment, the identifier associated with the certificate service request is a distinguished name having a set of attributes that are used to select the administrative domain. The set of attributes may correspond to the end-entity's common name, organizational name, organizational unit name, locality, country or any other information used to distinguish the end-entity.

In a further embodiment, the certificate authority selection unit determines a policy identification that identifies a set of policies for the selected administrative domain and selects the certificate authority based on the policy identification. The certificate authority selection unit may also apply the set of policies to the certificate service request.

In yet another embodiment, the certificate authority selection unit selects a signing key from a plurality of signing keys for the certificate authority. The signing key is part of a public/private key pair in a public key infrastructure system that the selected certificate authority uses to sign a certificate for the end-entity as a result of processing the certificate service request.

Such a dynamic methodology simplifies the end-entity certificate enrollment, revocation, and/or renewal process and minimizes administrative control and operations in large, multi-domain public key infrastructure systems. Those skilled in the art will realize that the above recognized advantages and other advantages described herein are merely illustrative and are not meant to be a complete rendering of all of the advantages of the various embodiments.

Referring now to the figures, and in particular to FIG. 1, there is shown a block diagram of a communication system 100 illustrating selection of a certificate authority in accordance with principles of the present disclosure. In one embodiment, communication system 100 comprises a public key infrastructure (PKI) system, which serves as a foundation for the implementation of public key cryptography and associated security mechanisms such as confidentiality, integrity, authentication, and non-repudiation. When an end-entity requires a signed certificate or other updating of a certificate in order to operate in a public key cryptography system, a certificate service request (CSR) for the end-entity is channeled to a certificate authority selection unit 120 that performs a method in accordance with the teachings herein to select the correct certificate authority (CA) to process the service CSR.

In one embodiment, the certificate authority selection unit 120 is a logical entity on one or more servers that is implemented as computer readable software code or firmware stored in memory that programs a processing device on the server to perform functions to enable certificate management in accordance with the teachings herein. In another embodiment, the certificate authority selection unit 120 is implemented as logic in hardware such as an application specific integrated circuit (ASIC). One physical machine may have many instances of the certificate authority selection unit running simultaneously to handle large volumes of end-entity requests, or there may be multiple physical machines running one or more certificate authority selection units.

Turning back to FIG. 1, system 100 comprises a certificate authority selection unit 120 in relation to multiple end-entities 102, 104, 106, 108, 110, 112 and multiple public key infrastructure components, namely, serving registration authorities 140, 142, 144, 146, 148 and certificate authorities 150, 152, 154, 156, 158. System 100 further includes administrative domains 130, 132, 134 serviced by the plurality of registration authorities and certificate authorities in the system.

In the present illustrative embodiment, the end-entities, 102, 104, 106, 108, 110, and 112 interface with the certificate authority selection unit 120 through a common user interface 114. The common user interface 114 may be a web-enabled interface, such as the internet, an intranet, server or other similar user interface which enables an end-entity to access the certificate authority selection unit. The common interface enables viewing of such things as service requests, selected administrative domains for the service request, and end-entity security profiles. The common interface also allows for the selected administrative domain and/or the public key infrastructure components to be accepted, changed, or denied.

A certificate service request includes, but is not limited to, a request for certificate enrollment, renewal, or revocation. Certificate enrollment is a process of an end-entity applying for a certificate. Certificate renewal is the process of obtaining a new certificate of the same class and type for the same subject once an existing certificate has expired. Certificate revocation is the process of permanently ending the operational period of a certificate from a specified time forward. Each of these certificate service requests requires a certificate to be signed from a certificate authority.

The certificate service request submitted by the end-entity through the common user interface includes one or more datafields or fields, one of which includes an identifier which can comprise, but is not limited to, a distinguished name having a set of attributes that are used to select the administrative domain. The distinguished name is a set of data that identifies a real-world entity, such as a person or other end-entity; and the set of attributes may correspond to the end-entity's common name, organizational name, organizational unit name, locality, country or any other information used to distinguish the end-entity. Examples of distinguished name attributes include: countryName=US, state=Illinois, organizationName=Acme, commonName=JohnDoe. In an embodiment, the identifier in the service request comprises a distinguished name having a set of attributes that includes a common name, organizational name, organizational unit, and locality.

The certificate service request with the identifier comprising a distinguished name is received by the certificate authority selection unit 120. An administrative domain to manage the service request is then selected by the certificate authority selection unit 120. For example, in FIG. 1, the one of the administrative domains 130, 132, and 134 selected to service the certificate servicing request is selected based on the distinguished name in the end-entity identifier. An administrative domain is a collection of hosts, servers, databases, routers, and the like and their interconnecting network(s), managed by one or more administrative entities. The administrative domains are serviced by one or more certificate authorities 150, 152, 154, 156, 158. In addition, the selected administrative domain is governed by a set of public key infrastructure policies and procedures ("policies") that may be applied to the service request in order to determine the appropriate certificate authority.

Registration authorities 140, 142, 144, 146, and 148 are also, optionally, selected based on the selected administrative domain to verify and confirm information submitted by the certificate authority selection unit 120 prior to forwarding the service request to the certificate authority 150, 152, 154, 156, 158. A registration authority verifies the request and information submitted by the candidate to ensure the information submitted is accurate and appropriate and is trusted to register other end-entities and perform vetting operations. For example, different registration authorities may have different abilities to verify different candidates (for example, executives versus salaried employees). Registration authorities are described in standards such as International Telecommunications Union Telecommunication Standardization Sector (ITU-T) X.509 for PKI, for instance, and specified in and Internet Engineering Task Force (IETF) Request for Comments (RFC) 5280 dated May 2008. If the request is appropriate for the end-entity, the certificate service request is forwarded by the registration authority to the appropriate certificate authority that signs or endorses the certificate.

The elements of the present disclosure, such as the certificate authority selection unit, can be embodied in one or more physical machines such as servers, databases, and/or other computer-based devices and are shown as discrete elements in order to further understanding of the present disclosure. Similarly, multiple registration authorities and certificate authorities are also shown; however, there may be one or more public key infrastructure components, such as registration authorities and certificate authorities, in an embodiment. In addition, multiple public key infrastructure components for various administrative domains 130, 132, 134 can be created as virtual registration and/or certificate authorities within one physical computing device (such as personal computers and servers) wherein the end-entity service requests are initiated from the common interface 114.

Figure 2:
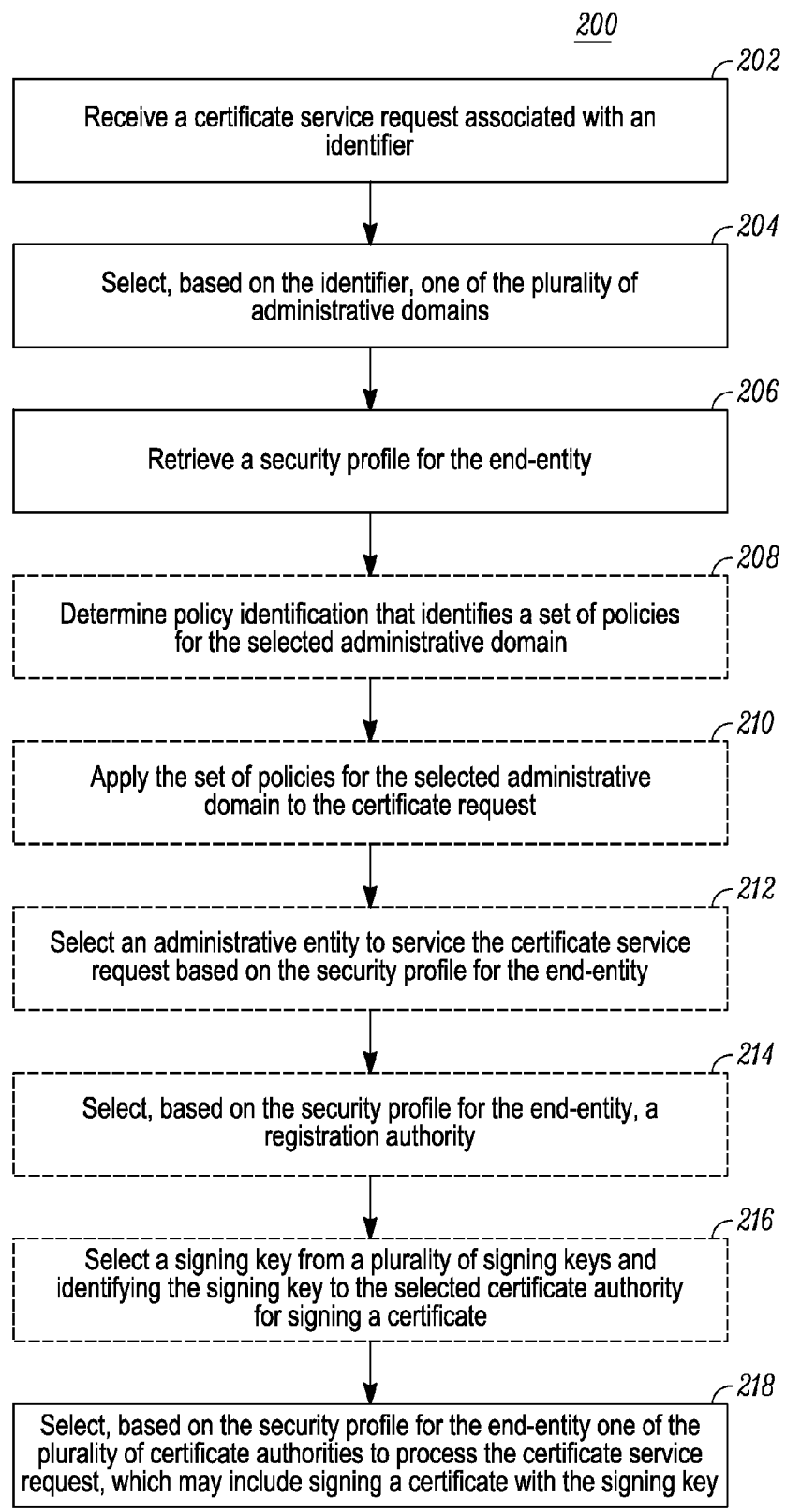
FIG. 2 is a flow diagram illustrating a method for selecting a certificate authority in accordance with an embodiment.
Figure 4:
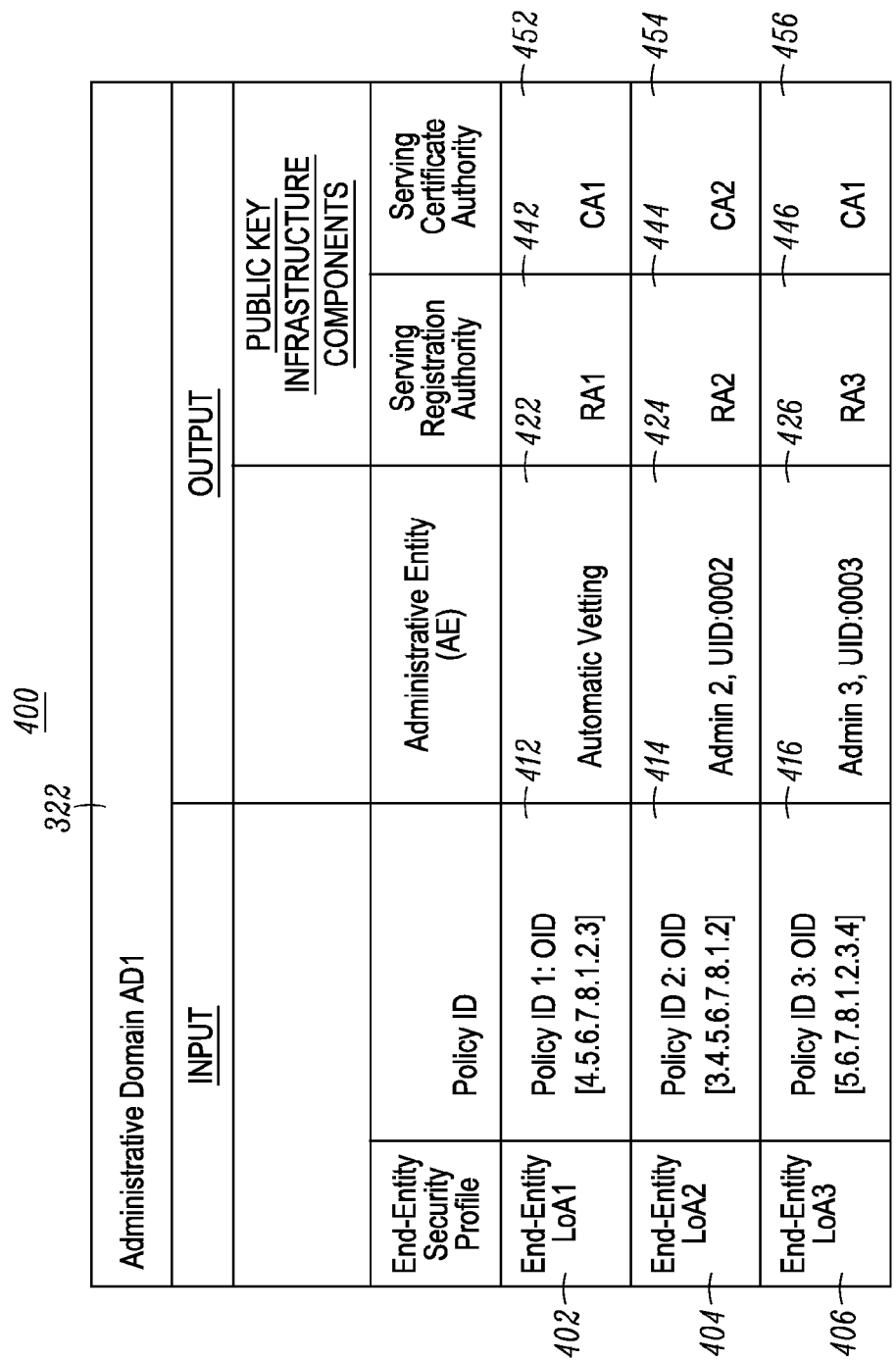
FIG. 4 is illustration of end-entity security profile and policy ID to administrative entity, registration authority, and certificate authority mapping in accordance with an embodiment.

Turning now to FIGS. 2-4 (and with reference to FIG. 1), FIG. 2 shows a flow diagram of an illustrative method 200 for managing CAs in a communication system that can be implemented, for example, by the certificate authority and selection unit 120. In accordance with method 200, a certificate service request with an associated identifier is received by the certificate authority selection unit 120, at block 202. When the end-entity service request is received by the certificate authority selection unit, the certificate authority selection unit uses the identifier to select one of a plurality of administrative domains, block 204. Determination of an appropriate administrative domain to service a request is enabled, in one embodiment, by a mapping table. For example, administrative domain mapping can be based on one or more distinguished name attributes (e.g., organization, organizational unit, etc) and one or more administrative domains (such as AD1, AD2 . . . ). An example of a mapping of several organizational units to administrative domains is shown in FIG. 3. An administrative domain can have several such mapping tables associated therewith based on any distinguished name attribute or a combination of those attributes.

Multiple possible distinguished names are present in mapping Table 300 of FIG. 3. In the present example, a distinguished name field (DN[O]) for a Company X includes different distinguished names associated with the organizational unit attribute. The distinguished names include: marketing 302, engineering 304, sales 306, research and development 308 and other 310. Each of these distinguished names is mapped to a corresponding administrative domain. Administrative domain 322 (AD1) is mapped to distinguished name marketing 302, and distinguished name sales 306. Administrative domain 324 (AD2) is mapped to distinguished name engineering 304 and distinguished name research and development 308. Administrative domain 326 (AD3) is mapped to distinguished name other 310. Using this distinguished name mapping table 300, the certificate authority selection unit maps the end-entity to the appropriate administrative domain. For example, if the distinguished name of the end-entity indicates that its organizational name is Company X and its organizational unit is marketing, the certificate authority selection unit maps to the table 300 for organizational name of Company X and to the organizational unit, Marketing 302. Thus, using mapping table 300, the administrative domain 326 assigned to the end-entity is quickly ascertained.

Turning back to FIG. 2, when the administrative domain is selected for the end-entity request, the certificate authority selection unit 120 retrieves an end entity security profile (ESP) in the administrative domain, block 206, and verifies the service request. The ESP includes one or more parameters or fields such as, Organization Name (O), Organizational Unit (OU), Level of Assurance (LoA), Security Clearance (SC), Certificate Validity Period (CVP), and Location (L), etc. Moreover, the end-entity security profile need not be attributed to an individual or individual profile, but could include a group or group profile. For example, all end-entities with a common identification parameter, such as a distinguished name where the distinguished names are the same or related, may be assigned the same ESP.

In this illustrative embodiment, the administrative domain is also associated with a policy identification that identifies a set of policies, such as PKI policies (OID), which govern the management, pre-screening, vetting, etc., of certificate service requests. Accordingly, the certificate authority selection unit 120 determines, 208, the policy identification (e.g., from a lookup table) for the selected administrative domain and applies, 210, the corresponding set of policies to the certificate service request.

In one illustrative implementation, such application of the AD's set of policies to the certificate service request allows the certificate authority selection unit 120 to prescreen the certificate service request to verify whether the service request contains the public keys of the required size (as stipulated by the AD's policies). In other illustrative implementations, applying the AD's set of policies to the certificate service request allows the certificate authority selection unit 120 to prescreen the service request to enforce proper certificate usage and to enforce proper use of distinguished name naming convention. In verifying whether the service request contains a certificate usage that is appropriate for the requesting end-entity, in one embodiment key usage or extended key usage (for example, a user identity, SSL Client, SSL Server, S/MIME, serverAuth, clientAuth, emailProtection, and the like) is examined. For instance, a key usage field in the service request defines the type of cryptographic operation that can be performed with the key in the certificate (i.e. digital Signature, non-repudiation, and key encipherment). The certificate usage can also be used to define the applications that can be accessed.

In addition, the certificate authority selection unit 120 may forward the set of policies and/or rules or portions thereof of the selected administrative domain to the serving registration and certificate authorities of that administrative domain, thereby enabling the registration and certificate authorities to verify the request and issue the certificate according to the policies/rules. Thus, in this embodiment, the policies of the administrative domain and the end entity security profile facilitate certificate authority selection and the certificate authority signing the certificate.

Mapping of information in the end-entity security profile to appropriate administrative domains, profiles governing the administrative domains, administrative entities, and public key infrastructure components (e.g., registration authorities and certificate authorities), are shown in FIG. 4. Mapping of the end-entity security profile to a number of parameters enables selection (214, 218) of a suitable serving public key infrastructure component. For example, Table 400 in FIG. 4 maps the end-entity security profile to administrative domain Policy IDs 412, 414, and 416, Administrative Entities (AE) 422, 424, 426, registration authorities (RA) 442, 444, 446 and certificate authorities (CA) 452, 454, 456. There may be one or more instances of mapping tables for each administrative domain, wherein the mapping is based on the end entity's security profile in the administrative domain and/or identifier in the service request.

In this particular illustrative implementation, the level of assurance (LoA) ESP parameter is used for the mapping to ultimately select the appropriate CA to service a service request. However, any of the ESP parameters or fields (e.g., O, OU, LoA, SC, CVP, L, etc.) or any suitable combination thereof can be used for such a mapping. Moreover, the mapping table may be populated from different sources. For example, end entity LoA data is from the security profile supplied by the administrative domain, and the Policy Identification (Id) is a data field from the service request.

Referring to FIGS. 2 and 4, the certificate authority and selection unit 120 selects (212), based on the ESP for the end-entity, an administrative entity within the administrative domain that has appropriate privileges (e.g., proper security clearance) to service the certificate service request and automatically alerts the administrative entity that the service request is available for vetting (examining or processing). The administrative entity vets the end-entity service request and validates and/or signs the service request prior to forwarding the certificate onto the certificate authority (mapped to the AE) for signing. The administrative entity may be a human or a server or database or other computer-based medium that receives the security profile as well as the identifier in the service request. Using the security profile, the administrative entity refers to a mapping table to determine (218) the appropriate certificate authority and, if appropriate, also selects (214) a registration authority to process the certificate service request. In this example, the administrative entity within the administrative domain thus, also assists in the selection of the appropriate certificate authority based on the end-entity profile. However, the certificate authority selection unit 120 could also participate in selecting or solely select (214, 218) the RA and CA based on the ESP, under the control of the mapping table 400.

Turning back to the illustrative mapping shown in FIG. 4, a service request having the end-entity LoA 402, which is mapped to policy ID 412, is automatically vetted by registration authority 442 (without processing by an administrative entity) before being forwarded to certificate authority 452 for certificate signing. In another example shown in FIG. 4, end-entity LoA 404 is mapped to Policy ID 414, administrative entity 422, registration authority 444 and certificate authority 454, such that the request is assigned to administrative entity 422. Administrative entity 422 then vets the request per rules in Policy ID 414, then signs the certificate service request and sends it to RA 444 for further vetting before forwarding the service request to certificate authority 454 for certificate signing. Further shown in FIG. 4, end-entity LoA 406 is mapped to Policy ID 416, administrative entity 426, registration authority 446 and certificate authority 454, which signs the service request.

In another embodiment, the certificate authority selection unit selects a signing key from a plurality of signing keys and identifies the signing key to the selected certificate authority for signing the certificate service request, block 216. For example, the certificate authority selection unit selects and forwards to the certificate authority a signing key-pair identification (from a set of available signing key-pair identifications) that corresponds to a public/private key pair, and the certificate authority uses the private key of the selected key pair to sign the end-entity service request. The choice of the signing key-pair is based on the end-entity's security profile and/or information contained in the end-entity security request, such as a requested certificate usage profile. As stated above, the certificate authority selection unit pre-screens the end-entity service requests by verifying whether the service request contains the public keys of the required key size (as stipulated by the administrative domain's policies). The key-pair selection may also be enabled by the end-entity security profile to administrative domain policy (OID) mapping, shown as part of end-entity security profile to public key infrastructure component mapping for a given administrative domain.

The present disclosure simplifies end-entity service request interface through the means of an enterprise-wide simple common end-entity interface. It also minimizes administrative oversight and control through the use of virtual certificate authorities that can be supported within one physical computing device and dynamic selection of serving certificate authorities and administrative entities based on the parameters contained in end-entity service requests.

In the foregoing specification, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for indicating status of channels assigned to a talkgroup described herein. The non-processor circuits may include, but are not limited to, a radio receiver, a radio transmitter, signal drivers, clock circuits, power source circuits, and user input devices. As such, these functions may be interpreted as steps of a method to perform the indicating of status of channels assigned to a talkgroup described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for selecting a certificate authority in a communication system comprising a plurality of administrative domains, the method comprising:
    at a certificate authority selection unit,
        receiving, from an end-entity via an interface, a certificate service request associated with an identifier;
        selecting, based on the identifier, one of the plurality of administrative domains in the communication system, wherein the plurality of administrative domains are serviced by a plurality of certificate authorities;
        retrieving a security profile for the end-entity; and
        selecting, based on the security profile for the end-entity, one of the plurality of certificate authorities to process the certificate service request.

2. The method of claim 1, wherein the identifier comprises a distinguished name having a set of attributes.

3. The method of claim 2, wherein the one administrative domain is selected based on the set of attributes in the distinguished name.

4. The method of claim 2, wherein a mapping table is used to select the administrative domain based on the distinguished name.

5. The method of claim 1 further comprising the certificate authority selection unit selecting a registration authority based on the security profile for the end-entity.

6. The method of claim 1 further comprising the certificate authority selection unit selecting an administrative entity to service the certificate service request based on the security profile for the end-entity, wherein the selected certificate authority is mapped to the selected administrative entity.

7. The method of claim 1 further comprising the certificate authority selection unit determining a policy identification that identifies a set of policies for the selected administrative domain, and selecting the certificate authority based on the policy identification.

8. The method of claim 7 further comprising the certificate authority selection unit applying the set of policies for the selected administrative domain to the certificate service request.

9. The method of claim 1, wherein the certificate service request comprises one of a certificate enrollment request, a certificate renewal request, or a certificate revocation request.

10. The method of claim 1 further comprising the certificate authority selection unit selecting a signing key from a plurality of signing keys and identifying the signing key to the selected certificate authority for signing a certificate as a result of processing the certificate service request.

11. The method of claim 10, wherein the signing key is a private key in a public/private key pair that is selected from a plurality of public/private key pairs.

12. A system for processing certificate service requests, the system comprising:
    a plurality of administrative domains coupled to and serviced by a plurality of certificate authorities;
    an interface that receives a certificate service request from an end-entity, wherein the certificate service request is associated with a distinguished name;
    a certificate authority selection unit coupled to the plurality of administrative domains and the interface and that:

selects, based on the distinguished name, one of the plurality of administrative domains;

determines a policy identification that identifies a set of policies for the selected administrative domain retrieves a security profile for the end-entity; and selects, based on the security profile and the policy identification, one of the plurality of certificate authorities to process the certificate service request.

13. The system of claim 12, wherein the interface comprises a common interface that places the certificate service request in a common format, wherein the common interface is accessible across multiple geographical regions.

14. The system of claim 12, wherein the plurality of certificate authorities comprise virtual certificate authorities on a single physical machine.

15. The system of claim 12, wherein at least some of the plurality of certificate authorities are located on different physical machines.

16. The system of claim 12, wherein the system comprises a public key infrastructure (PKI) system.

17. A non-transitory computer-readable storage element having computer readable code stored thereon for programming a computer to perform a method for selecting a certificate authority in a communication system comprising a plurality of administrative domains, the method comprising:

receiving, from an end-entity via an interface, a certificate service request associated with a distinguished name having a set of attributes;

selecting, based on the attributes of the distinguished name, one of the plurality of administrative domains in the communication system, wherein the plurality of administrative domains a serviced by a plurality of virtual certificate authorities;

retrieving a security profile for the end-entity;

selecting, based on the security profile for the end-entity, one of the plurality of virtual certificate authorities to process the certificate service request;

selecting a key pair from a plurality of key pairs, wherein the selected key pair comprises a private key and a public key, and identifying the key pair to the selected virtual certificate authority for signing a certificate using the private key upon processing the certificate service request.

18. The non-transitory computer-readable storage element of claim 1, wherein the method further comprising:

determining a policy identification that identifies a set of policies for the selected administrative domain; and using a mapping function to select the virtual certificate authority based on the policy identification and the security profile for the end-entity.

\* \* \* \* \*